United States Patent

Harrington

[11] Patent Number: 5,583,953
[45] Date of Patent: Dec. 10, 1996

[54] INTELLIGENT DOUBLING FOR LOW-COST IMAGE BUFFERS

[75] Inventor: Steven J. Harrington, Holley, N.Y.

[73] Assignee: Xerox Corporation, Stamford, Conn.

[21] Appl. No.: 83,581

[22] Filed: Jun. 30, 1993

[51] Int. Cl.⁶ ..................................................... G06T 9/00
[52] U.S. Cl. ........................ 382/239; 382/176; 382/299; 358/467; 395/116
[58] Field of Search .................................. 382/9, 56, 47, 382/21, 22, 176, 239, 299, 300, 203; 395/139, 102, 116; 358/467, 462, 451

[56] References Cited

U.S. PATENT DOCUMENTS

| | | | |
|---|---|---|---|
| 4,183,013 | 6/1980 | Agrawala et al. | 382/203 |
| 4,454,593 | 6/1984 | Fleming et al. | 395/139 |
| 4,547,812 | 10/1985 | Waller et al. | 358/459 |
| 4,620,288 | 10/1986 | Welmers | 382/1 |
| 4,959,868 | 9/1990 | Tanioka | 382/9 |
| 4,986,526 | 1/1991 | Dastin . | |
| 5,001,576 | 3/1991 | Tanaka et al. | 358/462 |
| 5,048,112 | 9/1991 | Alves et al. | 382/56 |
| 5,204,665 | 4/1993 | Bollman et al. | 358/520 |
| 5,265,176 | 11/1993 | Miller | 382/47 |
| 5,293,430 | 3/1994 | Shiau et al. | 358/455 |
| 5,335,295 | 8/1994 | Ferracini et al. | 358/451 |
| 5,347,368 | 9/1994 | Mochizuki | 358/462 |

*Primary Examiner*—Joseph Mancuso
*Assistant Examiner*—Larry J. Prikockis
*Attorney, Agent, or Firm*—Oliff & Berridge

[57] ABSTRACT

A method and apparatus for achieving an ultra-small or compressed image buffer images at half the resolution and then scales by two to achieve the device resolution. Acceptable quality can be maintained by identifying edge and interior portions of the page image and using this information to scale intelligently. A split-level frame buffer provides this identification of the image components. Further, an extension of block-truncation coding can be used with the split-level frame buffer to provide up to a 16 to 1 compression for an overall compression of up to 64 to 1. Actual techniques to scale these encodings are described along with new encodings for graphics and text designed this high compression of the image.

30 Claims, 7 Drawing Sheets

| 1 | 1 |
|---|---|
| 1 | 0 |

FIG.4A

| 0 | 0 |
|---|---|
| 0 | 1 |

FIG.4B

| 1 | 0 |
|---|---|
| 1 | 1 |

FIG.4C

| 0 | 1 |
|---|---|
| 0 | 0 |

FIG.4D

| 1 | 1 | 1 | 1 |
|---|---|---|---|
| 1 | 1 | 1 | 1 |
| 1 | 1 | 1 | 0 |
| 1 | 1 | 0 | 0 |

FIG.5A

| 0 | 0 | 0 | 0 |
|---|---|---|---|
| 0 | 0 | 0 | 0 |
| 0 | 0 | 0 | 1 |
| 0 | 0 | 1 | 1 |

FIG.5B

| 1 | 1 | 0 | 0 |
|---|---|---|---|
| 1 | 1 | 1 | 0 |
| 1 | 1 | 1 | 1 |
| 1 | 1 | 1 | 1 |

FIG.5C

| 0 | 0 | 1 | 1 |
|---|---|---|---|
| 0 | 0 | 0 | 1 |
| 0 | 0 | 0 | 0 |
| 0 | 0 | 0 | 0 |

FIG.5D

| a | a | b | c |
|---|---|---|---|
| a | a | b | c |
| a | b | c | c |
| b | b | c | c |

FIG.6

| 1 | 1 | 0 | 0 |
|---|---|---|---|
| 1 | 1 | 0 | 0 |
| 1 | 0 | 0 | 0 |
| 0 | 0 | 0 | 0 | a bitmap

FIG.7A

| 0 | 0 | 1 | 0 |
|---|---|---|---|
| 0 | 0 | 1 | 0 |
| 0 | 1 | 0 | 0 |
| 1 | 1 | 0 | 0 | b bitmap

FIG.7B

| 0 | 0 | 0 | 1 |
|---|---|---|---|
| 0 | 0 | 0 | 1 |
| 0 | 0 | 1 | 1 |
| 0 | 0 | 1 | 1 | c bitmap

FIG.7C

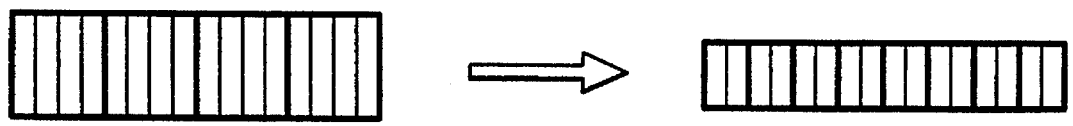
FIG.8A  FIG.8B
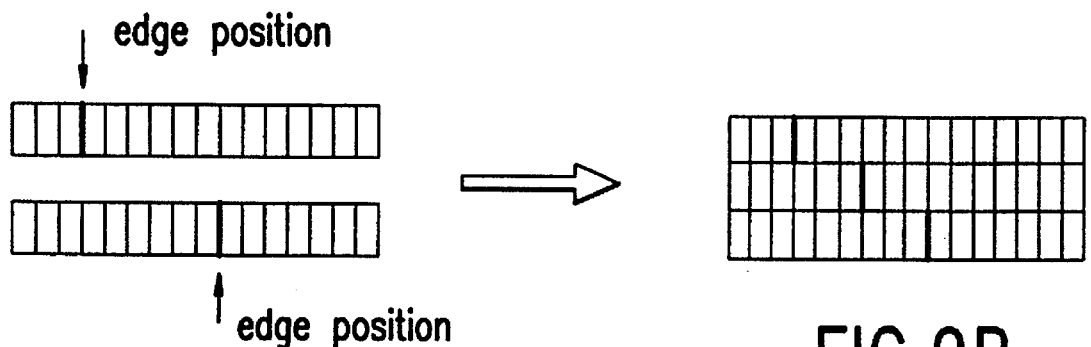
edge position
edge position
FIG.9A  FIG.9B
| a | b |
|---|---|
| c | d |
FIG.10
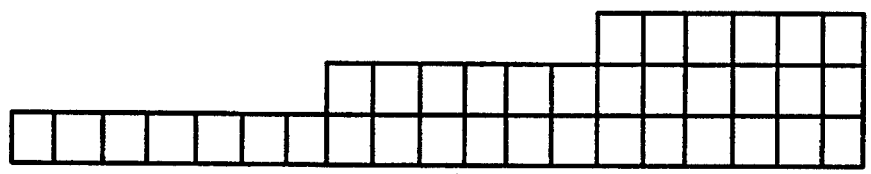
FIG.11
FIG.12

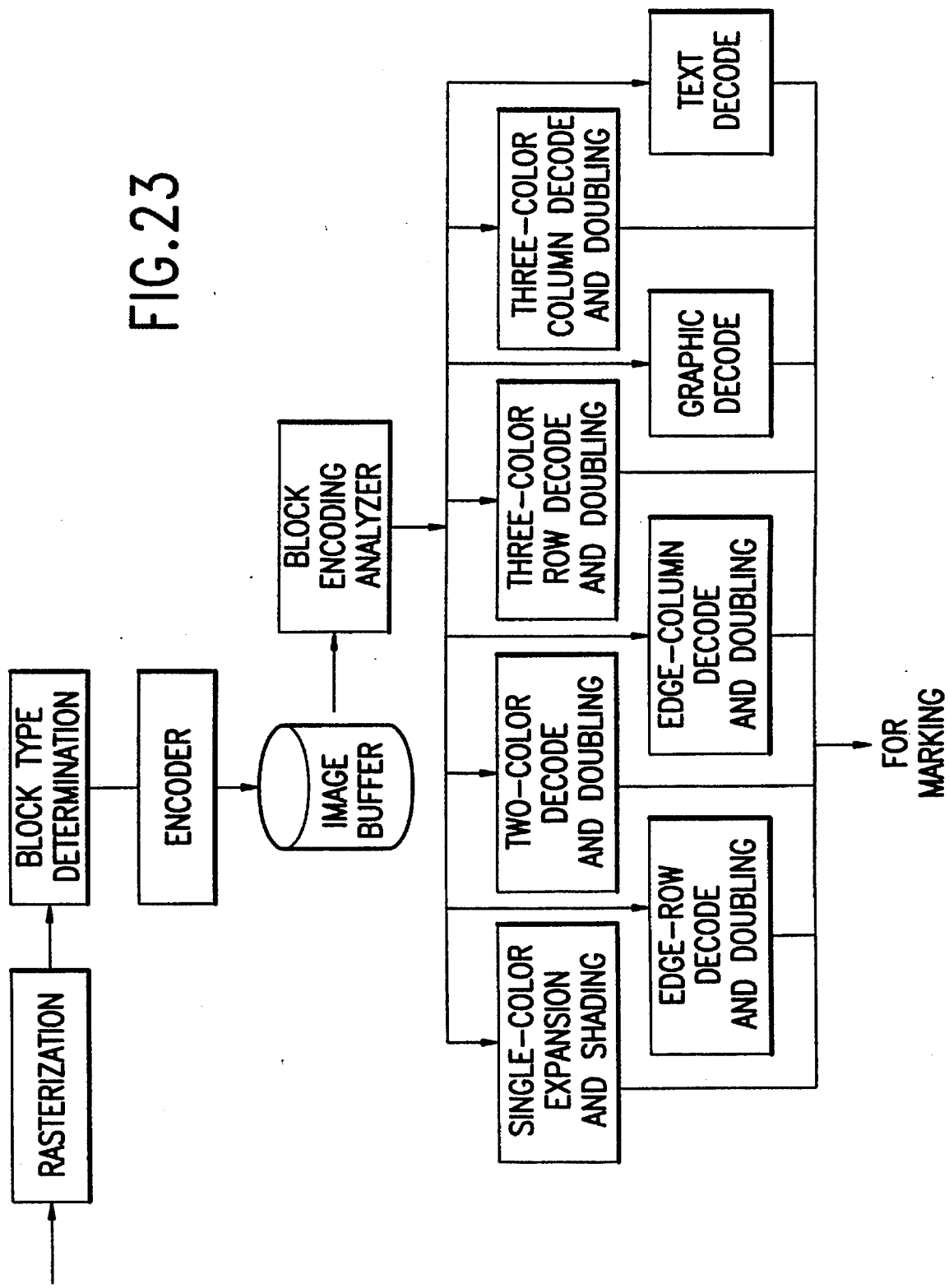

INTELLIGENT DOUBLING FOR LOW-COST IMAGE BUFFERS

BACKGROUND OF THE INVENTION

The present invention relates to a method and apparatus for reducing the size of an image buffer in a color printer, and more particularly, to intelligent doubling of scaled images, wherein smooth areas of an image are distinguished from edges and are scaled differently. The invention provides scaling methods for the encodings used in the split-level image buffer and further encodings useful for graphics and text.

Modern page description languages describe a page as a sequence of primitive drawing commands. The full page image is constructed by executing these commands and collecting the image elements they produce. Printers form an internal representation of the desired page in a computer memory prior to marking. The memory is called the image buffer and typically contains a color value for every spot or pixel that can be marked. The page can have a large number of pixels (e.g. 90,000 to 360,000 per square inch) and so a great deal of memory is typically required for the image buffer.

U.S. Pat. No. 5,276,532 entitled "Split-Level Frame Buffer" describes a method to reduce the amount of memory required to construct a full color page image for printing. The method encodes the page images using two resolutions, a low resolution for object interiors and a high resolution for object edges. This patent application is herein incorporated by reference. Subsequent inventions provide efficient encodings of the high resolution edge pixels for two-color patterns, edges separating two colors and ordered regions of three colors. Line graphics and scanned pictorial images can be expressed using these encodings resulting in a compression (or reduction of the memory requirements) of up to 16 to 1.

SUMMARY OF THE INVENTION

It is an object of the present invention to improve on the conventional techniques of image encoding, scaling and doubling.

It is a further object of the present invention to provide intelligent doubling for scaled images including multi-color block, curved edge encoding, graphics and to introduce line encoding and text encoding that maintain high quality resolution.

The present invention achieves these and other objects and advantages by providing an improvement of the conventional techniques that can provide an additional compression of 4 to 1 for an overall compression ratio of up to 64 to 1. This can mean a reduction of memory requirements from 60 MBytes for a full color page to less than 1 MByte and can give a substantial cost saving.

The method is to construct the image within a computer at half the required resolution for the marking device, and once the image is complete, to scale it (a few scan lines at a time) to the full size required for marking. A naive scaling of the image would be unacceptable, however, because edges would be too jagged or blurred, but when interior and edge regions have been identified, as in the case of the split-level image buffer, then different scaling methods can be applied to the different regions or encodings resulting in an image of acceptable quality.

More particularly, these objects are achieved by providing a method of doubling an image in a reduced image buffer for printing by a marking device. The method includes the steps of constructing the image at half a required resolution for the marking device; distinguishing smooth areas of the image from edges of the image; scaling the smooth areas by a first scaling technique; and scaling the edges by a second technique, where the second technique is different from the first technique.

In another aspect of the invention, a method of encoding a graphic image at full resolution for storing in a reduced image buffer for subsequent printing by a marking device is provided. The method includes the steps of distinguishing smooth areas of the image from edges of the image; determining a construction of the edges in a block of the image; and storing the construction in the reduced image buffer.

The determining step includes the step of describing an edge for the block by storing positions at which the edge enters and exits the block, and further includes the step of providing a tag and a color table index.

In an alternate aspect of the invention, the determining step includes the step of describing first and second edges for the block by storing positions at which the first edge enters and exits the block and an offset amount to the entry position of the second edge. The determining step can further include the step of providing a tag and a color table index. The determining step also includes the step of defining a corner of the image by storing an entry position of the corner on one side of the block and storing an exit position of the corner rotated 90 degrees so that it lies on the same side. In addition, the defining step can further include the step of describing first and second edges for the corner by storing an offset amount.

In yet another aspect of the invention, a method of encoding text characters at full resolution for storing in a reduced image buffer for subsequent printing by a marking device is provided. The marking device includes a font cache storing bitmaps of the characters. The method includes the steps of providing a pointer for accessing the character bitmaps stored in the font cache; and storing the pointer in the reduced image buffer. In a variant aspect, the method further includes the step of determining whether the characters or a background are colored, and the step of providing color indices indicating the color of the character or background in accordance with the determining step.

In still another aspect of the invention, a method of doubling an image in a reduced image buffer for printing by a marking device is provided. The method includes the steps of dividing the image into the uniform blocks, corresponding to the moderate resolution pixels of the split level frame buffer identifying interior and edge regions and distinguishing between region types. The image types include pictorial, graphic and line, and text. Blocks of each region type are encoded differently and stored in the reduced image buffer. Pictorial regions are encoded at half a required resolution for the marking device and scaled in accordance with the determining step.

In another aspect of the invention, a method is provided for encoding and storing a pixel block. The method includes the steps of storing a representation of the block at half resolution values and scaling the block to full resolution values for marking. The block size is 8×8 pixels. In addition, the scaling step further includes the step of filtering, which is performed by calculating the full resolution values as a weighted sum of neighboring half resolution values.

In an alternate aspect of the invention, the block contains two colors, and the scaling step includes the steps of recognizing corner patterns and smoothing the corner patterns at full resolution.

In still another aspect of the invention, the block contains three colors that always occur in the same order in each row or column. The scaling step includes the steps of generating bitmaps for at least two of the three colors and scaling the bitmaps. The bitmap scaling step can include the steps of recognizing corner patterns and smoothing the corner patterns at full resolution.

In yet another aspect of the invention, the block contains an edge between two colors. The scaling step includes the step of using edge placement values to determine which full resolution pixel contains the edge for each of the half resolution rows or columns.

An apparatus is provided for carrying out the above-described methods.

BRIEF DESCRIPTION OF THE DRAWINGS

These and other aspects and advantages of the present invention will become apparent from the following detailed description of preferred embodiments when taken in conjunction with the accompanying drawings, in which:

FIGS. 4A–D illustrate corner patterns in two color blocks;

FIGS. 5A–D show the corner patterns of FIG. 4 as smooth corners;

FIG. 6 illustrates a three color block;

FIGS. 7A–C illustrate bitmaps for a three color block;

FIGS. 8A–B illustrate the expanding of a row in curved edge encoding;

FIGS. 9A–B depict the constructing of a row by interpolation in curved edge encoding;

FIG. 10 shows a four pixel region in a smoothing operation;

FIG. 11 illustrates steps in a nearly horizontal edge for line encoding;

FIG. 12 shows the doubled edge of FIG. 11 having jagged two pixel steps;

FIG. 23 is a schematic illustration of the apparatus of the present invention.

DETAILED DESCRIPTION OF PREFERRED EMBODIMENTS

The following detailed description of preferred embodiments is applicable to numerous image systems and buffers as would be contemplated by those of ordinary skill. A non-limiting example of such a system is described in U.S. Pat. No. 4,986,526, which is hereby incorporated by reference.

The following describes intelligent doubling schemes for some of the encodings of the split-level frame buffer. New encodings are also described for lines and text, which provide smoother lines and optimal characters under the doubling scheme.

Low-resolution pixel

Figure 1:
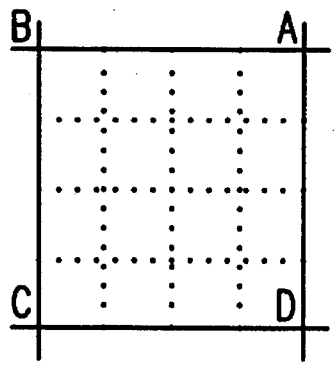
FIG. 1 depicts corner colors for a low resolution pixel.

A low-resolution pixel is a single color value for a 4×4 block of pixels. Simple doubling would replicate color over an 8×8 block. However this area is large enough to give visible "blocky" artifacts when sequences of pixels of varying colors are expanded. To reduce this, the colors of the previously expanded pixels above and left (A, B, C) are examined and those, together with the current pixel color (D), can provide the colors for the four corners of the block (see FIG. 1). One can then linearly interpolate the corner colors to determine color values for the pixels within the block (a technique known as Gouraud shading).

One further restriction is necessary. The previous colors (A, B, or C) are only used for the block corners provided they are close to the new pixel color D. If any of the previous colors differ from D by more than some tolerance, then color D should be used at that corresponding corner of the block. That is, the greater the difference, the more likely the image includes the sharp contrast in color, and smoothing should not be performed. The tolerance depends on the properties of the human visual system but requirements also vary with the application. Empirical studies suggest that if there is a difference of 32 or more in any of the red, green, or blue color components (where components range between 0 and 255), then the colors should not be interpolated.

Full half-resolution block

Figure 2:
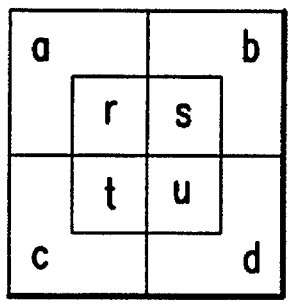
FIG. 2 shows the generation of double resolution from high resolution.

While it is usually possible to reduce a 4×4 block of pixels to one of the 32-bit special encodings, there may be blocks where none of the special cases work well, and where the 16 color values should be saved. To double such a full resolution block, each pixel is reproduced four times; but a smoother effect is produced through filtering with a low-pass filter, an edge-preserving filter or by calculating the expanded pixel color as a weighted average of neighboring unexpanded colors. In FIG. 2, a, b, c and d represent four unexpanded half-resolution pixels, and r, s, t and u represent the expanded values generated by them. This is achieved as follows:

$$r = w_1 a + w_2 b + w_3 c + w_4 d$$

$$s = w_1 b + w_2 d + w_3 a + w_4 c$$

$$t = w_1 c + w_2 a + w_3 d + w_4 b$$

$$u = w_1 d + w_2 c + w_3 b + w_4 a$$

The weights ($w_1$, $w_2$, $w_3$, $w_4$) describe the filter shape and sum to 1 (for example $w_1 = 3/8$, $w_2 = 1/4$, $w_3 = 1/4$, $w_4 = 1/8$).

Two-Color blocks

Figures 3A, 3B:
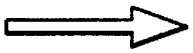
FIGS. 3A–B show a simple replication of a bitmap.

A two-color block has two colors and a bitmap to select between them. The simple scaling approach would be to replicate rows and then columns of the bitmap (FIGS. 3A–B). This, however, leads to jagged edges. The present system recognizes certain corner patterns before expansion (see FIGS. 4A–D) by a known technique and "fills in" or smooths these corners when doubling (see FIGS. 5A–D).

Three-color blocks

The three-color encoding describes blocks containing three colors that always occur in the same order along a row or column. From the encoding, a bitmap is derived of each of the three colors indicating which pixels receive the color. For example, if the block colors a, b, c occur as known in FIG. 6, then the bitmaps are as shown in FIGS. 7A–C. Actually, only two of the bitmaps are needed since the third can be derived as the complement of their disjunction. Once bitmaps for two of the three colors are derived, they can be expanded just as for the two-color case, yielding a prescription for coloring the three-color block.

Curved-edge encoding

The edge encoding describes the position of an edge between two colors along each row or column. The edge is positioned with sub-pixel precision, and the pixel containing the edge contains a mixture of the two colors weighted by the edge position. Doubling the length of a row or column is done by halving the sub-pixel placement accuracy. For example, with 16 edge positions in a row of four pixels, there would be four possible edge positions within each pixel. Expanding the row to eight pixels, there are 16 edge positions, but only two positions for each pixel (see FIGS. 8A–B). Having doubled the length of a row or column, the system doubles the number of rows or columns. This can be done by interpolating the edge position across two adjacent rows and constructing a new row between them (see FIG. 9).

Smoothing

The two- and three-color encodings require quantization of all the colors within a block to just two or three. This can introduce blockiness, which will be visible when the image is doubled. To reduce this, an additional smoothing or filtering operation is performed on the pixels belonging to blocks of these classes. The color of a pixel is replaced with a weighted average of it and its neighbors. For example, referring to FIG. 10, looking at a four-pixel region a, b, c, d, d can be replaced with d' where $$d'=w_1 a+w_2 b+w_3 c+w_4 d.$$

For a simple average, $w_1=w_2=w_3=w_4=¼$.

One modification can be made to this scheme. The color differences between the pixel being replaced is examined with its neighbors (d to a, d to b, and d to c). If any neighbor differs from the color of the pixel being replaced by more than some threshold, then the value of the neighbor color is replaced with the value of the pixel being replaced for the calculation. For example, if color c differs from color d by more than the threshold, then the value of $w_3 d$ instead of $w_3 c$ is used for the $w_3$ term in the calculation. The same threshold can be used here as is used in the expansion of low-resolution blocks.

Graphics and line encoding

Figure 13:
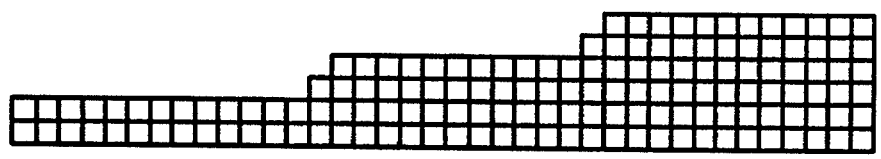
FIG. 13 shows the FIG. 11 steps doubled using two-color smoothing.
Figure 14:
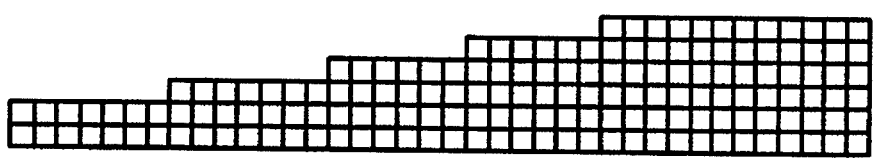
FIG. 14 illustrates the generation of intermediate steps.

The encodings discussed thus far were devised for representing pages without doubling; the doubling techniques were then added as an extension. But knowing that the page resolution will be doubled provides a motivation for devising new encodings. These encodings can improve the quality of line graphics and text. Consider a nearly horizontal or nearly vertical line. These lines have fairly long runs of pixels between steps to new rows or columns (see FIG. 11). Referring to FIG. 12, when naively doubled, these lines will have jagged edges at the steps. The techniques used for the two-color pixels can only round the corners of the steps (FIG. 13). Accordingly, a description of the edge that would allow creation of intermediate steps when decoding is desirable (see FIG. 14).

Figure 15:
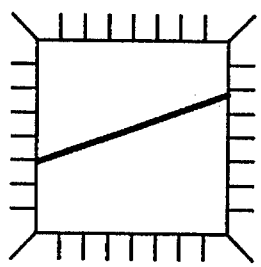
FIG. 15 depicts the operation of defining an edge by entry and exit positions.

This can be done if the edge for a block is described rather than the bit pattern that the edge generates. This is accomplished by storing the positions at which the edge enters and exits the block. For example, each side of the block can be divided into 8 positions (32 positions for all four sides of the block), and the closest position for entry of the edge and the closest for its exit are specified (see FIG. 15). The specification would take 5 bits for each position or 10 bits total. Actually, this can be reduced to 9 bits because of the symmetry of the entry and exit (i.e., 10 bits are only required if the edges are directed). The remaining bits of the block descriptor are then used for a tag and a color table index to describe two colors separated by the edge.

If only 10 bits are needed for the edge, there are 22 bits of a 32-bit word remaining for a tag and color table index. This is more than adequate, and some of those bits can be used to extend the encoding to cover more of the likely cases. Often, the edge will be the side of a line or stroke. If it is a thin line, then both of its sides or edges may be contained within the block. The encoding described above can handle one edge in the block, however, not two. To remedy this, it is assumed that the block contains two parallel edges. The two edges are described by the entry and exit positions of one of the edges along with the offset to the entry position of the second edge. Without loss of generality, the entry position of the second edge is specified as a clockwise offset of steps along the boundary of the block from the entry position of the first edge. The offset is no more than half way around the block, or 16 steps, so only 4 bits are required for the offset. Thus, 14 bits can specify two parallel edges.

Figure 16:
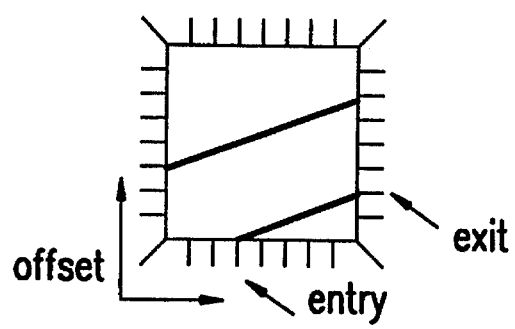
FIG. 16 shows the defining of parallel edges by entry, exit and offset.

While this encoding describes blocks with two edges, it can also be used for blocks with a single edge. A second edge offset of zero can be assumed to indicate that there is no second edge, that is, a single-edge block (FIG. 16).

Figure 17A:
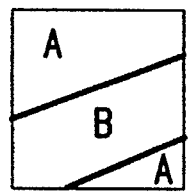
FIG. 17A–B show an embodiment wherein two edges can separate two or three colors.
Figure 17B:
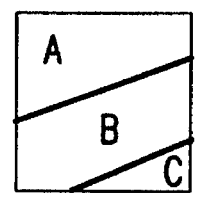

Two edges can separate either two colors or three colors (see FIGS. 17A–B). The color table index might be used with either a two-color or three-color table. An additional bit can be used to indicate which color table should be used.

Figure 18:
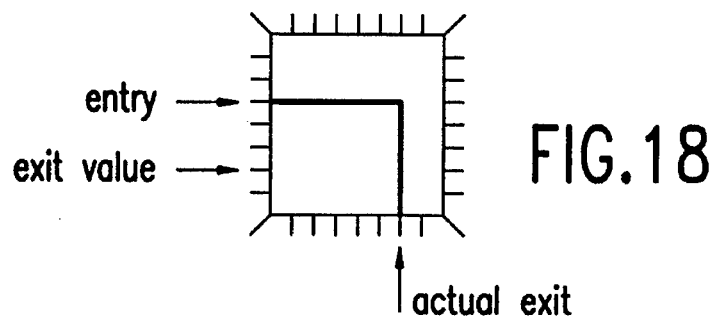
FIG. 18 shows the operation of defining a corner in graphics encoding.

The encoding for edges specifies both entry and exit position for one of the edges. It allows the specification of the same side of the block for both entrance and exit. This is, of course, impossible, so there are a number of specifications that cannot be drawn. To take full advantage of the encoding, these specifications can be used to describe another commonly occurring case, a right-angle corner formed from horizontal and vertical edges. The entry position can specify the entry of the corner. An exit position on the same side as the entry can be interpreted as an exit of a corner on the next side (counterclockwise) (see FIG. 18).

Figure 19:
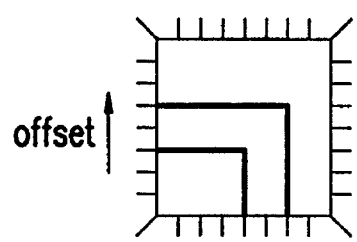
FIG. 19 illustrates a stroke corner in graphics encoding.

The parallel edge offset value can be used with the corner specification to describe a right-angle joint in a stroke (FIG. 19).

Figure 20:
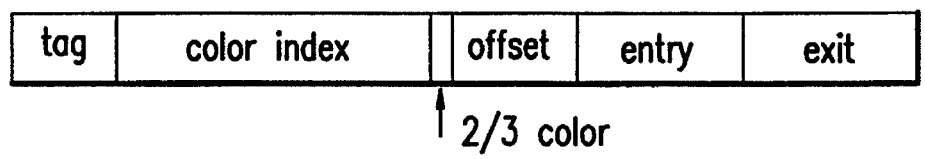
FIG. 20 illustrates two edge encoding.

A picture of the two-edge encoding word is shown in FIG. 20. The two-edge encoding describes the entry and exit positions of the edges to within ⅛ of a block. This matches the resolution needed for the doubled resolution where each block becomes an 8×8 array of pixels. The edges can be drawn with patterns (hat give smooth steps and avoid jagged edges. Horizontal and vertical edges can be positioned to the full accuracy of the device (rather than the half resolution of the image buffer).

The two-edge encoding only works for edges that both enter and exit the block. If an edge terminates within the block then one of the other encodings (two-color or three-color) must be used.

Text

The sharp clean edges of high quality text require the full resolution of the device. Using two-color blocks and doubling (with smoothing) may cause the loss of fine serifs or may give errors where strokes meet. The graphical two-edge encoding is also inadequate since the characters will often generate blocks with more than two edges, or edges that are not parallel. To handle text, the full resolution bitmap for the character is required. It is possible to do this because the actual bitmap need not be placed in the image buffer. Instead, a pointer or reference to the bitmap can be placed in the image buffer, and the actual bitmap can be saved in a font cache. This way, a single bitmap determining a character shape can be used for all instances of that character.

Figure 21:
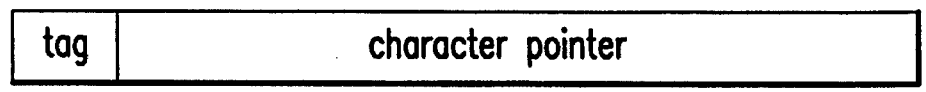
FIG. 21 shows black and white text encoding.

In order to position the character arbitrarily within the block, the pointer should address the bitmap down to the bit. A 24-bit pointer would be sufficient to reference a 2 MByte font cache. However, it would be impossible to squeeze a 24-bit pointer, tag and reasonable color-table index into a single 32-bit word. If the colors are taken to be black text on a white background, then the color table index is not needed, and a single word is adequate (FIG. 21).

Figure 22:
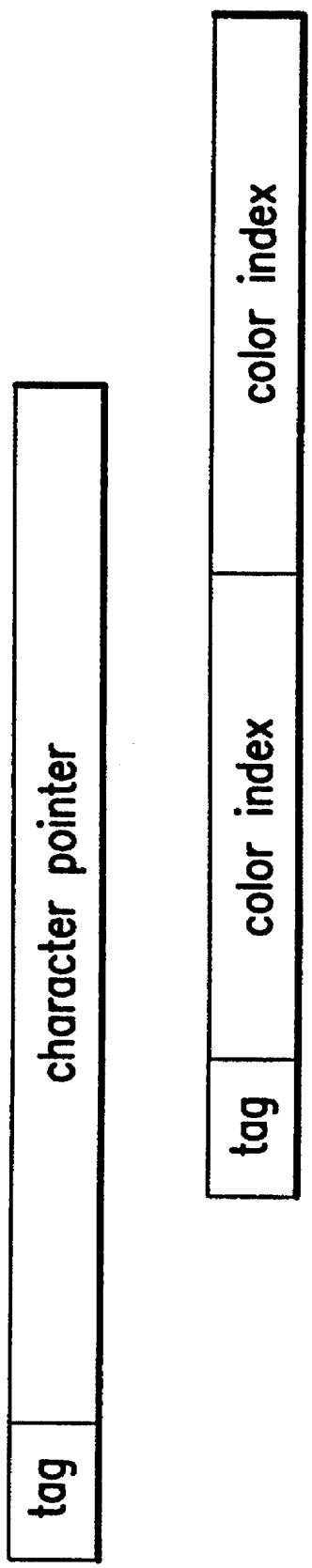
FIG. 22 illustrates colored text encoding.

If, however, either the text or background are colored, then the colors must be specified (as by a color table index), and this can be done by using a pair of consecutive blocks to specify a complete character reference. This is a viable approach because character bitmaps will almost always cover more than two pixel blocks. The first word can provide the pointer to the character bitmap, and the second word can provide the color indices for both blocks (FIG. 22).

FIG. 23 is a schematic illustration of the apparatus of the present invention. After rasterization of the image, it is determined which of the block types described above is being encoded, and encoding is performed. The encoded block is stored in the image buffer. For marking, the stored blocks are decoded and/or doubled using the above-described methods in accordance with the block type determination.

While the embodiments disclosed herein are preferred, it will be appreciated from this teaching that various alternatives, modifications, variations or improvements therein may be made by those skilled in the art that are within the scope of the invention, which is defined by the following claims.

What is claimed is:

1. A method of encoding a graphic image at full resolution for storing in a reduced image buffer for subsequent decoding and printing by a marking device, the method comprising the steps of:

segmenting said graphic image into blocks;

distinguishing smooth areas of the image from edges of the image;

determining a construction of the edges in a block of the image blocks, said determining step comprising describing an edge for the block by storing positions at which the edge enters and exits the block;

assigning reference points around the entire perimeter of the block relative to a given point; and storing the construction, encoded as the entry and exit points of the edge measured in terms of said reference points in the reduced image buffer.

2. A method according to claim 1, wherein said determining step further comprises the step of providing a tag and a color table index to a table of at least color pairs.

3. A method according to claim 1, wherein said determining step comprises the step of describing first and second edges for the block by storing positions at which the first edge enters and exits the block measured as a first distance in terms of said reference points and an offset amount from the entry position of the first edge to the entry position of the second edge measured as a second distance around the block perimeter.

4. A method according to claim 3, wherein said determining step further comprises the step of providing a tag and a color table index to a table of at least color pairs.

5. A method according to claim 1, wherein said determining step comprises the step of defining a right angle corner of the image by storing an entry position of the right angle corner measured as a first distance in terms of said reference points on one side of said block and storing an exit position measured as a second distance in terms of said reference points so that the exit position of the right angle corner is on the same side as the entry position.

6. A method according to claim 5, wherein said defining step further comprises the step of describing first and second edges for the corner by also storing a parallel edge offset value.

7. An apparatus for encoding a graphic image at full resolution for storing in a reduced image buffer for subsequent decoding and printing by a marking device, the apparatus comprising:

means for segmenting said graphic image into blocks;

means for distinguishing smooth areas of the image from edges of the image;

means for determining a construction of the edges in a block of the image blocks, said determining means comprising means for describing an edge for the block by storing positions at which the edge enters and exits the block;

means for assigning reference points around the entire perimeter of the block relative to a given point; and means for storing the construction, encoded as the entry and exit points of the edge measured in terms of said reference points, in the reduced image buffer.

8. An apparatus according to claim 7, wherein said determining means further comprises means for providing a tag and a color table index to a table of at least color pairs.

9. An apparatus according to claim 7, wherein said determining means comprises means for describing first and second edges for the block by storing positions at which the first edge enters and exits the block measured as a first distance in terms of said reference points, and an offset amount from the entry position of the first edge to the entry position of the second edge measured as a second distance around the block perimeter.

10. An apparatus according to claim 9, wherein said determining means further comprises means for providing a tag and a color table index to a table of at least color pairs.

11. An apparatus according to claim 7, wherein said determining means comprises means for defining a right angle corner of the image by storing an entry position of the right angle corner measured as a first distance in terms of said reference points on one side of said block and storing an exit position measured as a second distance in terms of said reference points so that the exit position of the right angle corner is on the same side as the entry position.

12. An apparatus according to claim 11, wherein said defining means further comprises means for describing first and second edges for the corner by also storing a parallel edge offset values.

13. A method of encoding and decoding a continuous tone image having a plurality of image region types, in a reduced image buffer with a uniform a block structure for printing by a marking device, wherein the image region types comprise pictorial and nonpictorial image region types and the nonpictorial image region types comprise at least one of text region types and graphic and line region types, the method comprising the steps of:

identifying edge regions and non-edge regions of said continuous tone image;

distinguishing between pictorial region types and non-pictorial region types;

encoding said continuous tone image according to said identifying step, by using different encoding methods for said edge regions, and said non-edge regions;

encoding pictorial region types at half a required resolution for the marking device;

storing said encoded continuous tone image in said reduced image buffer;

decoding said stored encoded continuous tone image in accordance with said identifying step that identifies edge regions; and doubling said pictorial region types, wherein said pictorial region types are decoded and doubled by the steps of, distinguishing smooth areas of the pictorial region types from edges of the pictorial region types;

resolution doubling said smooth areas by a first resolution doubling technique; and resolution doubling said edges by a second resolution doubling technique, said second resolution doubling technique being different from said first resolution doubling technique.

14. A method according to claim 13, wherein said text regions are further encoded by the steps of determining whether the characters or a background are colored, and providing color indices indicating the color of the characters or background in accordance with the determining step.

15. An apparatus for encoding and decoding a continuous tone image having a plurality of image region types, in a reduced image buffer with a uniform block structure for printing by marking a device, wherein the image region types comprise pictorial and nonpictorial image region types and the nonpictorial image region types comprise at least one of text region types and graphic and line region types, the apparatus comprising:

means for identifying edge regions and non-edge regions of said continuous tone image;

means for distinguishing between pictorial region types and non-pictorial region types;

means for encoding said continuous tone image according to identification of said edge regions and said non-edge regions;

means for encoding pictorial region types at half a required resolution for the marking device;

means for storing said encoded continuous tone image in said reduced image buffer;

means for decoding said stored encoded continuous tone image in accordance with said identifying means that identifies edge regions; and means for doubling said pictorial region types, wherein said means for decoding and doubling pictorial region types comprises, means for distinguishing smooth areas of the image from edges of the image;

means for resolution doubling said smooth areas by a first resolution doubling technique; and means for resolution doubling said edges by a second resolution doubling technique, said second resolution doubling technique being different from said first resolution doubling technique.

16. An apparatus according to claim 15, wherein said means for encoding said text regions further comprises means for determining whether the characters or a background are colored, and means for providing color indices indicating the color of the characters or background in accordance with the determining means.

17. A method of encoding and decoding a continuous tone image, having a plurality of image region types, in a a reduced image buffer with a uniform a block structure for printing by a marking device, wherein the image region types comprise pictorial and nonpictorial image region types and the nonpictorial image region types comprise at least one of text region types and graphic and line region types, the method comprising the steps of:

identifying edge regions and non-edge regions of said continuous tone image;

distinguishing between pictorial region types and non-pictorial region types;

encoding said continuous tone image according to said identifying step, by using different encoding methods for said edge regions, and said non-edge regions;

encoding pictorial region types at half a required resolution for the marking device;

storing said encoded continuous tone image in said reduced image buffer;

decoding said stored encoded continuous tone image in accordance with said identifying step that identifies edge regions; and doubling said pictorial region types, wherein said graphic and line region types are encoded by the steps of, segmenting said image into blocks;

distinguishing edge regions and non-edge regions of said graphic and line region types;

determining a construction of the edges in a block of the image blocks; and storing the construction in the reduced image buffer.

18. A method according to claim 17, wherein said determining step comprises the step of describing an edge for the block by storing positions at which the edge enters and exits the block.

19. A method according to claim 18, wherein said determining step further comprises the step of providing a tag and a color table index.

20. A method according to claim 17, wherein said determining step comprises the step of describing first and second edges for the block by storing positions at which the first edge enters and exits the block and an offset amount to the entry position of the second edge.

21. A method according to claim 20, wherein said determining step further comprises the step of providing a tag and a color table index.

22. A method according to claim 17, wherein said determining step comprises the step of defining a right angle corner of the image by storing an entry position of the right angle corner measured as a first distance around the block perimeter on one side of said block and storing an exit position measured as a second distance around the block perimeter so that the exit position lies on the same side as the entry position.

23. A method according to claim 22, wherein said defining step further comprises the step of describing first and second edges for the corner by also storing an offset amount of said entry position of said second edge from said entry position of said first edge measured as a distance around the block perimeter.

24. An apparatus for encoding and decoding a continuous tone image having a plurality of image region types, in a reduced image buffer with a uniform block structure for printing by marking a device, wherein the image region types comprise pictorial and nonpictorial image region types and the nonpictorial image region types comprise at least one of text region types and graphic and line region types, the apparatus comprising:

means for identifying edge regions and non-edge regions of said continuous tone image;

means for distinguishing between pictorial region types and non-pictorial region types;

means for encoding said continuous tone image according to identification of said edge regions and said non-edge regions;

means for encoding pictorial region types at half a required resolution for the marking device;

means for storing said encoded continuous tone image in said reduced image buffer;

means for decoding said stored encoded continuous tone image in accordance with said identifying means that identifies edge regions; and means for doubling said pictorial region types, wherein said means for encoding said graphic and line region types comprises, means for segmenting said image into blocks;

means for distinguishing edge regions and non-edge regions of said graphic and line region types;

means for determining a construction of the edges in a block of the image blocks; and means for storing the construction in the reduced image buffer.

25. An apparatus according to claim 24, wherein said determining means comprises means for describing an edge for the block by storing positions at which the edge enters and exits the block.

26. An apparatus according to claim 25, wherein said determining means further comprises means for providing a tag and a color table index.

27. An apparatus according to claim 24, wherein said determining means comprises means for describing first and second edges for the block by storing positions at which the first edge enters and exits the block and an offset amount from the entry position of the first edge to the entry position of the second edge.

28. An apparatus according to claim 27, wherein said determining means further comprises means for providing a tag and a color table index.

29. An apparatus according to claim 24, wherein said determining means comprises means for defining a right angle corner of the image by storing an entry position of the right angle corner measured as a first distance around the block perimeter on one side of said block and storing an exit position of the corner measured as a second distance around the block perimeter so that the exit position lies on the same side as the entry position.

30. An apparatus according to claim 29, wherein said defining means further comprises means for describing first and second edges for the corner by also storing an offset amount from the entry position of the first edge to the entry position of the second edge measured as a distance around the block perimeter.

\* \* \* \* \*